US012771270B2

(12) United States Patent
He et al.

(10) Patent No.: US 12,771,270 B2
(45) Date of Patent: Oct. 20, 2026

(54) PRECISION TWO-STAGE INTEGRATED MOTOR CONTROL

(71) Applicant: Alpha and Omega Semiconductor International LP, Toronto (CA)

(72) Inventors: ChengYuan He, Sunnyvale, CA (US); Jian Yin, San Ramon, CA (US); Sitthipong Angkititraku, Dublin, CA (US); Ralph Monteiro, Mountain View, CA (US)

(73) Assignee: Alpha and Omega Semiconductor International LP, Toronto (CA)

( * ) Notice: Subject to any disclaimer, the term of this patent is extended or adjusted under 35 U.S.C. 154(b) by 148 days.

(21) Appl. No.: 18/671,387

(22) Filed: May 22, 2024

(65) Prior Publication Data

US 2025/0364932 A1 Nov. 27, 2025

(51) Int. Cl.
*H02P 21/18* (2016.01)
*H02P 21/22* (2016.01)
*H02P 25/03* (2016.01)

(52) U.S. Cl.
CPC .............. *H02P 21/18* (2016.02); *H02P 21/22* (2016.02); *H02P 25/03* (2016.02)

(58) Field of Classification Search
CPC .......... H02P 25/03; H02P 21/18; H02P 21/22; H02P 25/026; H02P 6/183; H02P 7/02; H02P 6/08; H02P 6/28; H02P 6/14; H02P 6/16; H02P 21/0003; H02P 21/0021; H02P 21/34; H02P 23/18; H02P 23/02; H02P 29/60; H02P 29/68; H02P 29/027;
(Continued)

(56) References Cited

U.S. PATENT DOCUMENTS 6,522,098 B1 2/2003 Majumdar et al.
2018/0358916 A1 12/2018 Son et al.
2019/0157994 A1* 5/2019 Prabhala .................. G01B 7/30

FOREIGN PATENT DOCUMENTS

TW 202130112 A 8/2021
TW 202406293 A 2/2024
WO 2014196162 A1 12/2014

OTHER PUBLICATIONS

Foreign Office Action dated Mar. 6, 2026.

* cited by examiner

*Primary Examiner* — Antony M Paul
(74) *Attorney, Agent, or Firm* — Thompson Patent Law Offices PC

(57) ABSTRACT

Apparatus and associated methods relate to a motor driver package (MDP) for efficient control of an N phase motor system. In an illustrative example, the MDP may include N power transistors, a microcontroller unit (MCU), and a sensing circuit. For example, the MDP may be a unified physical package. The sensing circuit, for example, may include N sense field-effect-transistors (SENSEFET). Each of the SENSEFET is coupled to one of the N power transistors and is configured to generate a response corresponding to a drain output of the corresponding power transistor. In some implementations, in a high frequency mode, the MCU may generate N high frequency injection waveforms to each of the N power transistors. For example, the MCU may generate the N high frequency injection waveforms based on the response of each of the N phases. Various embodiments may advantageously provide an efficient solution for motor control applications.

20 Claims, 4 Drawing Sheets

(58) Field of Classification Search
CPC ............. H02P 2203/03; H02P 2203/09; H02P 2203/05; H02P 2205/01; H02P 2207/05; H02P 2101/45; H02P 2209/11; H02P 27/06; H02P 27/08; H02P 25/032; H01H 71/04; H01H 2071/044; H02H 3/08; H02H 3/20; H02H 3/38; B25J 19/02; B60L 13/06; H10W 90/756
See application file for complete search history.

PRECISION TWO-STAGE INTEGRATED MOTOR CONTROL

TECHNICAL FIELD

Various embodiments relate generally to electrical motor control systems for controlling motor functions with enhanced precision and efficiency.

BACKGROUND

Direct current (DC) motors are fundamental components in various applications across industries, converting electrical energy into mechanical rotation. Known for their straightforward design and ease of control, for example, DC motors may be used in a range of applications including household appliances to industrial machinery.

Brushless DC (BLDC) motor is one type of DC motor. BLDC motors, for example, may eliminate physical brushes by employing electronic commutation to control a motor's phases. For example, the BLDC motor may reduce mechanical wear of the motor. For example, BLDC motors may be used for precision applications including electric vehicles, power tools, drones, and medical devices, and other precision critical applications.

Motor phase of a DC motor may be essential in motor control operation in some examples. For example, a timing relationship between a rotor and an electrical current supplied to the motor may sometimes affect an efficiency of the motor. During initial startup, for example, a motor control may establish a correct phase-current relationship. For example, the phase-current relationship may influence an efficiency of the motor's rotor. Without proper phase alignment, for example, the motor may experience inefficient operation, excessive noise, and/or startup failures. In some examples, proper phase control/measurement may be important in precision applications to avoid damage to the system and/or to provide the precise control needed for delicate operations.

SUMMARY

Apparatus and associated methods relate to a motor driver package (MDP) for efficient control of an N phase motor system. In an illustrative example, the MDP may include N power transistors, a microcontroller unit (MCU), and a sensing circuit. For example, the MDP may be a unified physical package. The sensing circuit, for example, may include N sense field-effect-transistors (SENSEFET). Each of the SENSEFET is coupled to one of the N power transistors and is configured to generate a response corresponding to a drain output of the corresponding power transistor. In some implementations, in a high frequency mode, the MCU may generate N high frequency injection waveforms to each of the N power transistors. For example, the MCU may generate the N high frequency injection waveforms based on the response of each of the N phases. Various embodiments may advantageously provide an efficient solution for motor control applications.

Various embodiments may achieve one or more advantages. For example, the N high frequency injection waveforms may advantageously facilitate detection of a motor initial position detection and/or a determination of North-South pole of the motor. For example, the ITSDM 105 may advantageously mitigate errors associated with high-frequency signal injection mode. In some examples, the ITSDM 105 may advantageously provide a smoother motor startup and control of the motor system 100. In some examples, the ITSDM 105 may advantageously streamline PCB layout complexities. For example, the ITSDM 105 may enhance power density and suitability for, for example, compact motor applications. For example, the ITSDM 105 may advantageously be applicable in space-constrained motor installations.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1:
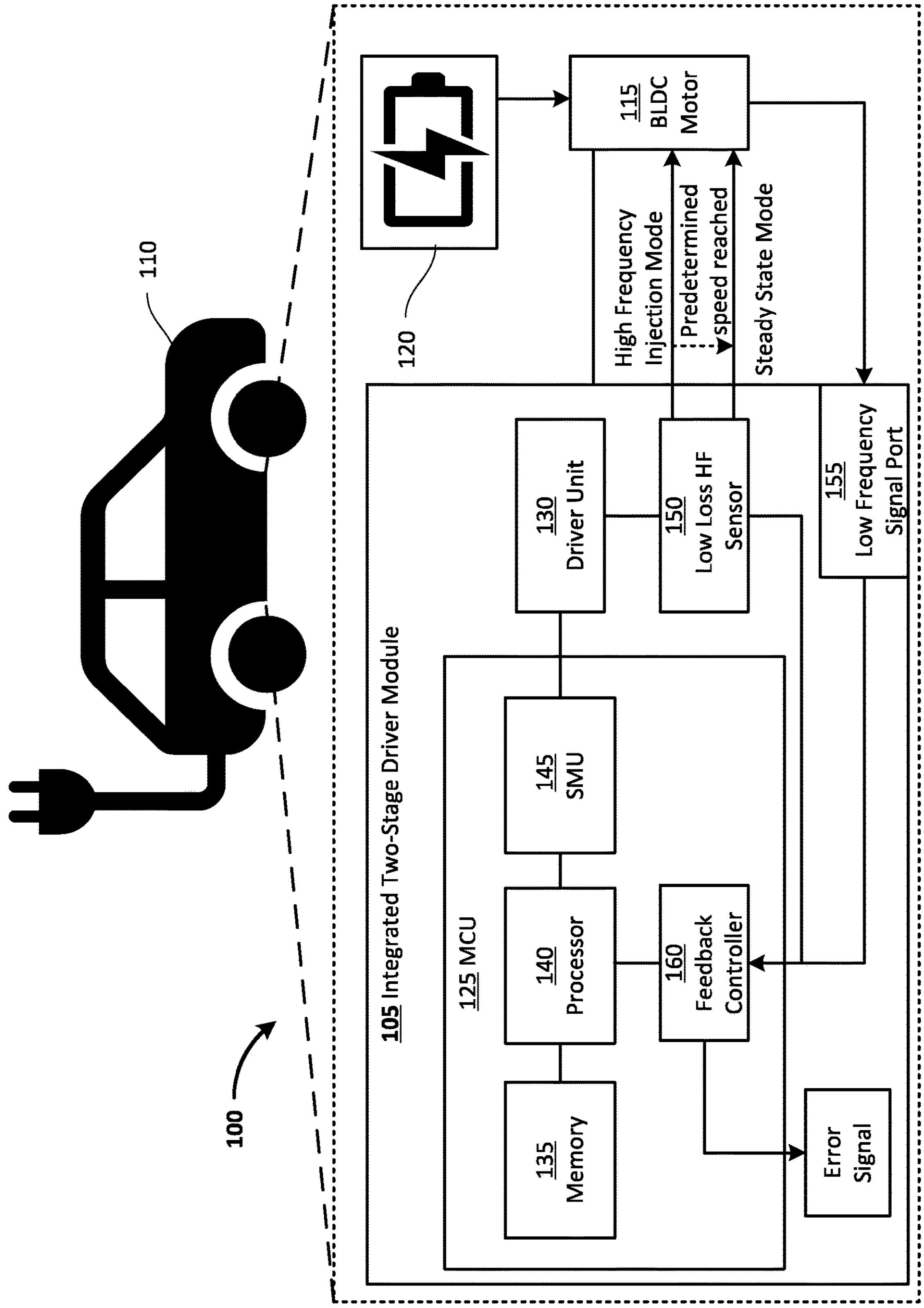
FIG. 1 depicts an exemplary Integrated Two-Stage Driver Module (ITSDM) employed in an illustrative use-case scenario.

FIG. 1 depicts an exemplary Integrated Two-Stage Driver Module (ITSDM) employed in an illustrative use-case scenario. In this example, a motor system 100 may be embedded in an electric vehicle (EV 110). The motor system 100 includes an ITSDM 105 and a brushless direct current motor (BLDC motor 115). The ITSDM 105, as shown, is coupled to the BLDC motor 115. The BLDC motor 115 is connected to a power source 120. For example, the power source 120 may be a battery pack. The power source 120 may, for example, include a plurality of rechargeable cells configured to store and supply electrical energy to the BLDC motor 115. The power source 120 may, for example, include a battery management system (BMS) configured to monitor and regulate the voltage, current, temperature, and state of charge of the cells. The power source 120 may, for example, include a cooling system configured to maintain the optimal operating temperature of the cells and the BMS.

The ITSDM 105, in this example, includes a microcontroller unit (MCU 125) and a driver unit 130. In some embodiments, the MCU 125 may be configured to generate control signals to control the BLDC motor 115. For example, the driver unit 130 may generate the control signals based on input from the MCU 125. In some implementations, the driver unit 130 may include a (e.g., three phase, six phase, twelve phase) gate driver electrically connected to one or more power transistors. For example, the ITSDM 105 may include one power transistor per motor phase. For example, the gate driver may generate a signal to control a gate voltage of a corresponding power transistor of a phase. In some examples, the power transistor may generate a drain current based on the gate voltage received from the (three phase) gate driver.

For example, the control signals may be configured to control a speed and/or torque output of the BLDC motor 115. The driver unit 130 is connected to the MCU 125. For example, the driver unit 130 may receive the control signals from the MCU 125. In some implementations, the driver unit 130 may generate gate drive signals to the BLDC motor

115 as a function of the received control signals. In some examples, the driver unit 130 may include power transistors (e.g., power MOSFETs). For example, the power transistors may generate power signals to the BLDC motor 115.

The driver unit 130, in some implementations, may be configured to modulate a power delivered to the BLDC motor 115 from the power source 120. For example, the driver unit 130 may be configured to ensure synchronized switching of the power transistors. For example, the driver unit 130 may reduce power losses in the motor system 100.

As shown, the MCU 125 may include a memory 135 and a processor 140. In this example, the MCU 125 includes a signal modulation unit (SMU 145). For example, the SMU 145 may include a space vector pulse wide modulation (SVPWM) unit. For example, the SMU 145 may include a sinusoidal pulse width modulation (SPWM) unit. For example, the SMU 145 may include a six-step commutation control. For example, the SMU 145 may adjust a phase error and a frequency error of the BLDC motor 115. Based on a phase and/or frequency of the BLDC motor 115, for example, the processor 140 may execute the SMU 145 to control signals to the driver unit 130.

In some implementations, in a high frequency injection mode, the SMU 145 may generate a periodic (e.g., quasi-sinusoidal, trapezoidal) waveform to the BLDC motor 115. For example, the SMU 145 may use a trapezoidal control wave to the driver unit 130. For example, the SMU 145 may generate a sinusoidal control wave to the driver unit 130. In various implementations, the ITSDM 105 may advantageously provide a sensor-less motor control waveform (e.g., trapezoidal, sinusoidal, near sinusoidal, other custom waveforms) for the BLDC motor 115 to determine an initial position (e.g., a North/South pole information) during a motor startup process.

In this example, the ITSDM 105 includes a low loss HF sensor (LLHFS 150). For example, the LLHFS 150 may include a transistor circuit (e.g., a current sensing circuit, a sense field-effect transistor (SENSEFET) circuit). For example, the LLHFS 150 may generate a high frequency feedback signals based on a measurement at (e.g., power transistors of) the driver unit 130. In various examples, the LLHFS 150 may generate both high frequency and low frequency feedback signals based on measurements at the driver unit 130. In various implementations, the ITSDM 105 may be a unitary package (an integrated circuit (IC) package) of the MCU 125, the driver unit 130, and the LLHFS 150. For example, the ITSDM 105 may advantageously mitigate errors associated with high-frequency signal injection mode. In some examples, the ITSDM 105 may advantageously provide a smoother motor startup and control of the motor system 100. In some examples, the ITSDM 105 may advantageously streamline PCB layout complexities. For example, the ITSDM 105 may enhance power density and suitability for, for example, compact motor applications. For example, the ITSDM 105 may advantageously be applicable in space-constrained motor installations.

The ITSDM 105 also includes, in this example, a low frequency signal port (LFSP 155). As shown, the LFSP 155 may receive a feedback signal from the BLDC motor 115. The MCU 125, for example, may receive low frequency feedback signals from the LFSP 155. For example, the MCU 125 may determine, based on the received low frequency feedback signals, a current phase and angular velocity of the BLDC motor 115.

In this example, the MCU 125 includes a feedback controller 160 connected to the LFSP 155. In various implementations, the feedback controller 160 may include a proportional-integral (PI) controller. For example, the feedback controller 160 may include a proportional-integral-derivative (PID) controller. In some implementations, in a steady state mode, the feedback controller 160 may receive the low frequency feedback signals from the BLDC motor 115 and generate the control signals to the driver unit 130.

As an illustrative example without limitation, the motor system 100 may be activated from a deactivated state. For example, the BLDC motor 115 may be stalled in an unknown phase with no speed in the deactivated state. During an activation process, the motor system 100 may be configured to transit into the high frequency injection mode. For example, in the high frequency injection mode, the SMU 145 is configured to inject a high frequency periodic signal to the BLDC motor 115. In some examples, the SMU 145 may determine an initial phase (e.g., an initial position) of the BLDC motor 115.

In some examples, the initial phase may be determined based on a response of the BLDC motor 115 to the injected high-frequency signal. For example, the SMU 145 may be configured to analyze a current response measured at the LLHFS 150. For example, the initial phase may be determined corresponding to the current (and/or voltage) response. For example, the SMU 145 may determine the initial phase of the BLDC motor 115 based on responses corresponding to different phases of the driver unit 130.

In some implementations, based on the initial phase, the MCU 125 may generate the control signals to energize the BLDC motor 115. For example, the MCU 125 may determine a right sequence to energize a correct phase to initiate motor rotation. After the motor rotation is started, for example, the LFSP 155 may continue to measure a motor speed (e.g., as a function of a measured back electromotive force (EMF) signal). In some implementations, the MCU 125 may operate from the high frequency injection mode to a steady-state mode at a predetermined motor operating frequency (e.g., 100 revolution per minute (RPM), 300 RPM, 500 RPM, 1000 RPM).

At the steady-state mode, for example, the feedback controller 160 may receive feedback signals from the LFSP 155. For example, a PID controller may generate the control signals based on the feedback signal to generate the control signals to the driver unit 130.

In various implementations, a motor driver IC package (e.g., the ITSDM 105) may include a transistor sensing circuit (e.g., the LLHFS 150, a SENSEFET) configured to measure an initial position of a motor (e.g., the BLDC motor 115) during a startup process of the motor. In some implementations, the motor driver IC package may be configured to operate in two modes. In the high frequency injection mode, the motor driver IC package may inject a high frequency periodic waveform (e.g., the quasi-sinusoidal waveform, the trapezoidal waveform) to control the motor. The motor driver IC package may include a low loss high frequency sensing circuit configured to measure, without using a current sensing resistor, a phase current response of the motor. The motor driver IC package may, for example, determine the initial phase of the motor to start the motor by adjusting the control signals. After the motor reaches a predetermined speed (e.g., 500 RPM), the motor driver IC package may transit into a steady-state mode. In the steady-state mode, the motor driver IC package may control the motor using an error correction controller (e.g., the feedback controller 160, a PI controller, a PID controller). In some implementations, the ITSDM 105 may advantageously reduce errors associated with high-frequency signal injection. For example, the ITSDM 105 may culminate in a smoother motor initiation (e.g., of the BLDC motor 115).

Figure 2:
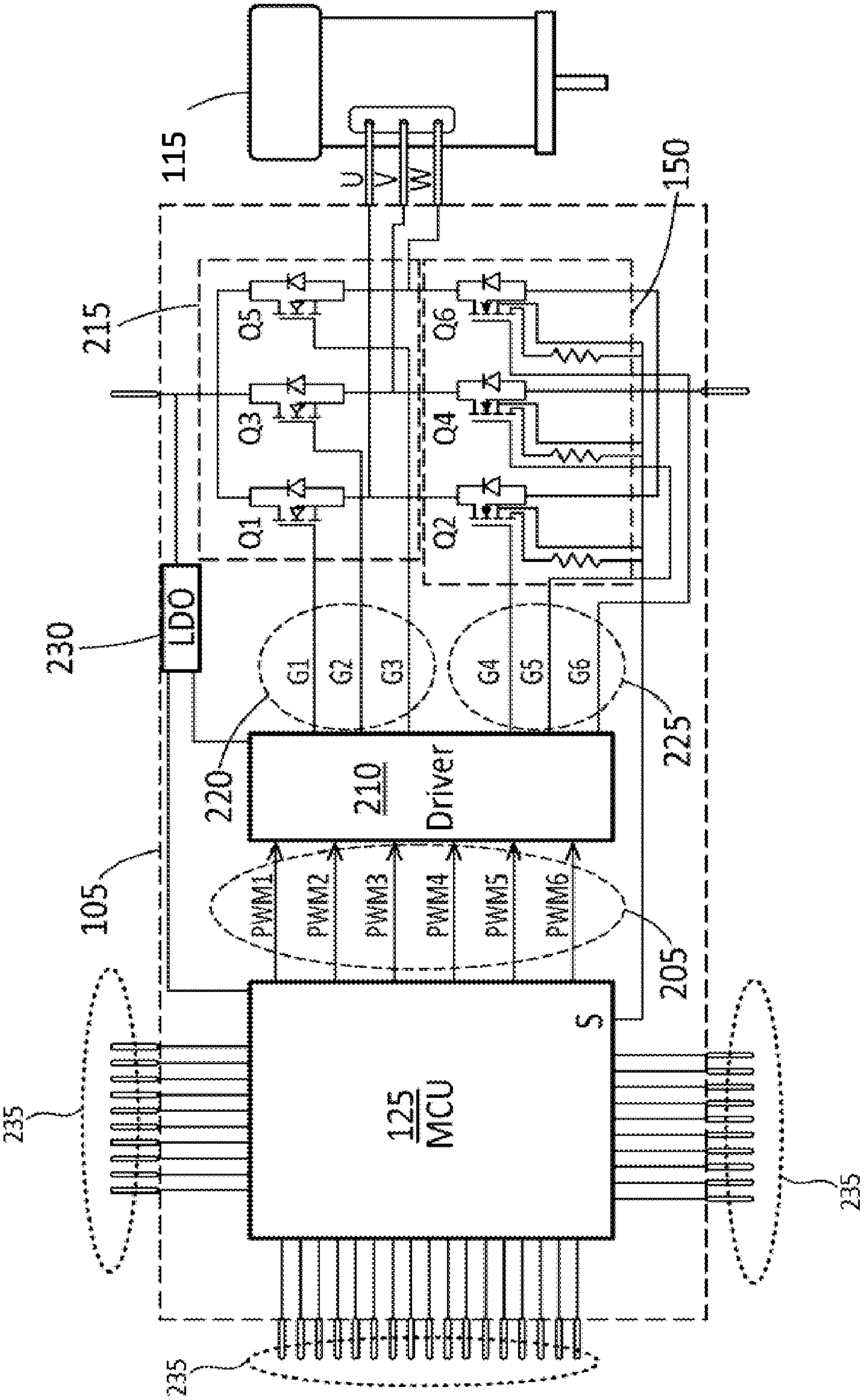
FIG. 2 is a block diagram depicting an exemplary ITSDM.

FIG. 2 is a block diagram depicting an exemplary ITSDM. As shown, the ITSDM 105 includes the MCU 125 and the LLHFS 150. The MCU 125, for example, may generate PWM control signals 205. For example, the PWM control signals 205 may be generated based on an output of the SMU 145 and/or the feedback controller 160. A driver module 210 receives the PWM control signals 205 to generate gate signals (G1-G6). In some implementations, the driver module 210 may amplify the PWM control signals 205. For example, the gate signals may be generated as a function of the PWM control signals 205. For example, G1-G6 may be generated as a periodic wave. As shown, G1-G3 are power gate signals 220. Each of the G1-3 may be connected to a gate terminal of one of three power transistors Q1, Q3, and Q5 of a power transistor circuit 215. For example, each of the Q1, Q3, and Q5 may be connected to a different phase of the MCU 125. For example, the power transistor circuit 215 may generate the control signals u, v, and w to the MCU 125 based on the gate signals G1-3. In various examples, the driver unit 130 (FIG. 1) may include the driver module 210 and the power transistor circuit 215.

As shown, the LLHFS 150 also includes three sense transistors (Q2, Q4, and Q6). For example, the sense transistors may include SENSEFET. For example, each single phase of the power transistor circuit 215 may be electrically coupled to one sense transistor. In some implementations, sense gate signals 225 of the SENSEFET, G4-6, may be directly proportional to a corresponding signal of the power gate signals 220. For example, G1=k*G4, where k is a positive number. For example, the power gate signals 220 and the sense gate signals 225 may be synchronously related.

As shown, each of the sense transistors includes a source terminal connected to a corresponding drain terminal of one of the power transistors Q1, Q3, Q5. In this example, a source terminal of Q2 is connected to a drain terminal of Q1, a source terminal of Q4 is connected to a drain terminal of Q3, and a source terminal of Q6 is connected to a drain terminal of Q5.

In various implementations, the sense transistor may be significantly smaller and have lower power consumption than the power transistors. In some examples, the sense transistors Q2, Q4, Q6, may be configured to generate a response having a predetermined relationship of a corresponding power transistor. For example, the predetermined relationship may be configured based on the power gate signals 220 and the sense gate signals 225. As shown, the LLHFS 150 may generate a sense output S. For example, the sense output S may include a combination of a sense current from each of the sense transistors Q2, Q4, Q6. For example, the MCU 125 may receive the sense output S.

Accordingly, for example, the MCU 125 may determine a signal phase at u, v, and w accurately by processing a current sensing response at input S. For example, the LLHFS 150 may advantageously provide a smaller, integrated version of the main power transistor with a proportional current path. For example, the LLHFS 150 may allow for a real-time monitoring of the current flowing through the power transistor without introducing significant losses through bulky resistors adapted for the higher power of the power transistors Q1, Q3, and Q5.

For example, the ITSDM 105 may remove a need for additional current sense resistors for sensing high frequency current response at the control signal output. In some implementations, by eliminating the need for extra high-current sense resistors, the ITSDM 105 may advantageously reduce power wastage and improve efficiency gain.

In this example, the ITSDM 105 also includes a low dropout regulator (LDO regulator 230). For example, the LDO regulator 230 may generate a stable voltage to the MCU 125, the PWM control signals 205 and the power transistor circuit 215, and other integrated circuits of the ITSDM 105.

In some implementations, the ITSDM 105 may advantageously provide a sensor-less field-oriented control (FOC) chip based on a current response based phase detection method. For example, the ITSDM 105 may determine a detected phase of the BLDC motor 115 based on a signal output from the LLHFS 150. In some implementations, the MCU 125 may independently control a magnitude and phase of motor currents based on the detected phase such that a position of a stator and a rotor of the BLDC motor 115 is deduced. As an illustrative example, the MCU 125 may generate the PWM control signals 205 based on the sense output S of the LLHFS 150 that may be directly related to a phase information of the BLDC motor 115. In some examples, the MCU 125 may be configured to maintain an orthogonal angle between the stator and the rotor. Various embodiments may advantageously enhance regulation of the BLDC motor 115's torque and speed.

As shown in FIG. 2, the MCU 125 further includes other input and output pins. For example, as an IC package, the ITSDM 105 may be configured to generate additional output and receive other inputs. Various embodiments are described below with reference to FIG. 3. Various embodiments may combine essential components for driving a BLDC motor within a unified package. For example, the unified package of the ITSDM 105 may advantageously save space.

In some examples, the ITSDM 105 may be configured to sense a current flow at a drain terminal of each power transistor Q1, Q3, Q5 without using current sense resistors (e.g., shunt resistors). For example, the LLHFS 150 may advantageously provide a low loss and temperature-insensitive component in determining current flows at the power transistors Q1, Q3, Q5. In various examples, the LLHFS 150 may include a stable working temperature between −40° C. to 125° C. For example, the MCU 125 may determine an initial phase of the BLDC motor 115 based on the current flows measured by the LLHFS 150.

In various examples, high-frequency injection may impose limitations on PCB layout due to its sensitivity to signal integrity. For example, the MCU 125 may require a high sensitivity in the high frequency signal injection mode to accurately determine a phase in the BLDC motor 115. For example, the required sensitivity may introduce errors in a high frequency signal injection process. For example, small errors (e.g., time, amplitude) in current measurements of the power transistors may adversely affect motor startup stability of the BLDC motor 115. In some implementations, the LLHFS 150 may enhance accuracy and/or reduce the required sensitivity. In some examples, the LLHFS 150 may reduce limitations of PCB layout design, which may be critical to mitigate these issues.

In various implementations, a motor driver package (e.g., the motor system 100) may include N phases (e.g., N=1, 2, 3, 6, 12, . . . ). Each of the N phases may include a power transistor (e.g., Q1, Q3, Q5) configured to generate control signals to a motor (e.g., the BLDC motor 115). In the high frequency signal injection mode, the MCU 125 (e.g., by executing a program of instructions of the SMU 145) may generate N control waveforms configured to control the N power transistors of the N phases.

In this example, the MCU 125 includes other input output pins (OIOPs 235). For example, the MCU 125 may receive feedback signals from external circuits. For example, the external circuits may include hall sensors configured to measure an EMF at the BLDC motor 115. For example, the OIOPs 235 may receive input from a temperature sensor. In some embodiments, the OIOPs 235 may include communication pins. For example, the communication pins may be configured to communicate with external devices or systems. For example, the communication pins may support various communication protocols, such as serial peripheral interface (SPI), inter-integrated circuit (I2C), universal asynchronous receiver-transmitter (UART), controller area network (CAN), or LIN bus. For example, the communication pins may transmit or receive data, commands, or status information to or from an external controller, a sensor, a display, or a user interface device. Various embodiments of the OIOPs 235 are described with reference to FIG. 3.

Figure 3:
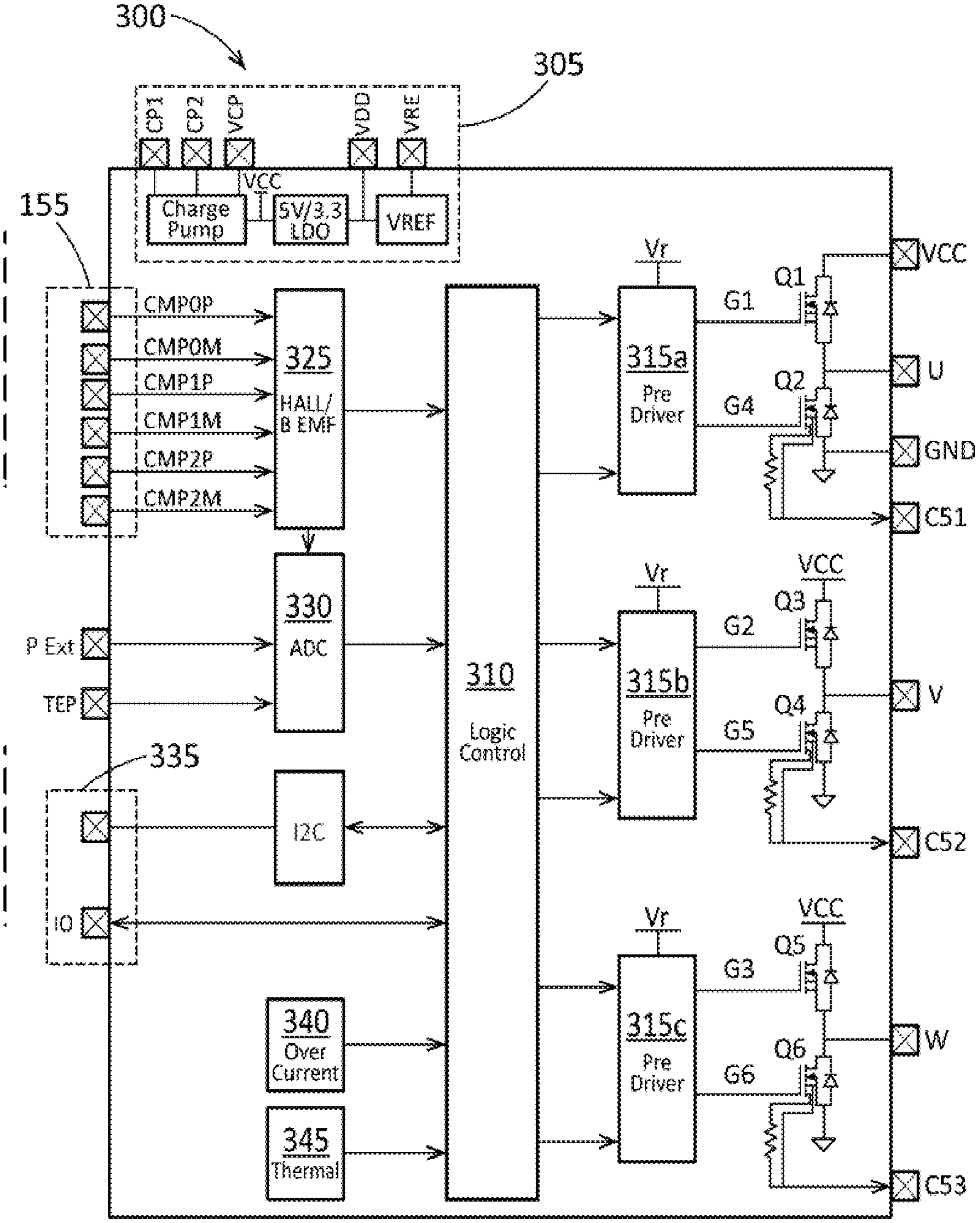
FIG. 3 depicts an exemplary electrical schematic of an exemplary ITSDM package.

FIG. 3 depicts an exemplary electrical schematic of an exemplary ITSDM package. For example, an ITSDM package 300 may be an IC circuit implemented in a single package. For example, the ITSDM package 300 may include the MCU 125, the driver unit 130 and the LLHFS 150 for controlling the BLDC motor 115. In some examples, the ITSDM package 300 may advantageously simplify layout intricacies (e.g., for designing the printed circuit board (PCB)). In some examples, the ITSDM package 300 may advantageously provide an augmented power density. For example, the augmented power density may enhance overall efficiency of the motor system 100.

In this example, the ITSDM package 300 includes power supply module 305 configured to supply power to various modules in the ITSDM package 300. The ITSDM package 300 also includes a logic control 310 and three pre-drivers 315*a-c*. Each of the pre-drivers 315*a-c* is connected to one of the power transistor and sensing transistor pairs (Q1-2, Q3-4, Q5-6). For example, the logic control 310 may include a processing unit (e.g., the processor 140 of the MCU 125). For example, the logic control 310 may include the feedback controller 160 of the MCU 125. For example, the logic control 310 may generate the power gate signals 220 and the sense gate signals 225 to corresponding pre-drivers 315*a-c*.

As an illustrative example, the logic control 310 may generate G1 and G4 to the pre-driver 315*a*, G2 and G5 to the pre-driver 315*b*, and G3 and G6 to the pre-driver 315*c*. As shown, the power transistor circuit 215 (including Q1-3) may generate the control signals u, v, and w. For example, the SENSEFET Q4-6 may generate output CS1, CS2, and CS3, respectively.

In this example, the ITSDM package 300 may receive a low frequency signal port 155. A hall effect or back EMF module 325 may receive the low frequency signal port 155 to generate a steady-state error measurement to the logic control 310. For example, the low frequency signal port 155 may be connected to a hall sensor of the BLDC motor 115. For example, each phase of the BLDC motor 115 may generate two inputs of the low frequency signal port 155. For example, the feedback controller 160 of the logic control 310 may generate PWM signals based on the steady-state error input.

As shown, the ITSDM package 300 also includes an analog to digital converter (ADC 330). In some implementations, the ADC 330 may receive an output from the hall effect or back BEMF module 325 and external input indicating a speed and a phase of the BDLC motor 115. For example, the speed and the phase information may be generated as a function of the SENSEFET output CS1-3. In this example, the ADC 330 may receive external input from an external temperature sensor. For example, the ADC 330 may receive an external output from an external potentiometer. In some implementations, the ADC 330 may be activated to generate input to determine an initial phase of the BLDC motor 115 in the high frequency injection mode. For example, the logic control 310 may receive the output of the ADC 330 and determine the initial phase of the BLDC motor 115. Various implementations may advantageously mitigate initial motor position errors of the motor system 100. As shown, for example, a reduction of using current sense resistors may advantageously provide a lossless and temperature invariant current sensing circuit.

The ITSDM package 300 further includes communication ports 335. For example, the communication ports 335 may be used to communicate with other devices and/or controller with analog and/or digital signals. An overcurrent protection module 340 may protect the ITSDM package 300 by overcurrent damages. A thermal module 345, for example, may generate a thermal compensation signal to the logic control 310.

Figure 4:
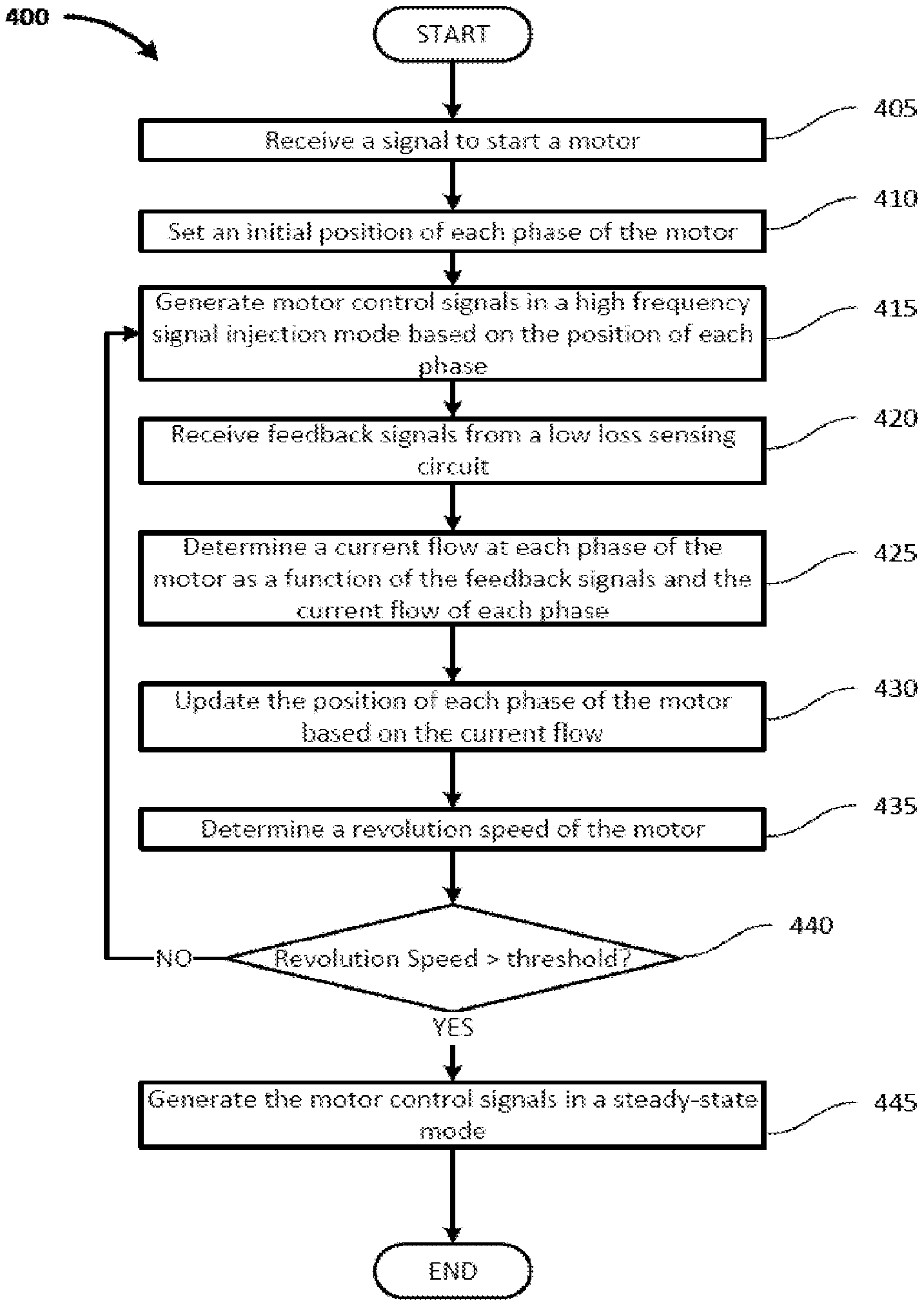
FIG. 4 is a flow diagram showing an exemplary sensorless waveform control initialization method.

FIG. 4 is a flow diagram showing an exemplary sensor-less waveform control initialization method 400. For example, the MCU 125 may use the method 400 to start the BLDC motor 115. In this example, the method 400 begins when a signal is received to start a motor in step 405. For example, the MCU 125 may receive a signal to start the BLDC motor 115 when the EV 110 is activated to move.

Next, an initial position of each phase of the motor is set in step 410. For example, the MCU 125 may load a preset position of the BLDC motor 115 from the memory 135. For example, the MCU 125 may load from the memory 135 position of each of the phases of the BLDC motor 115 based on last known positions of the phases.

In step 415, motor control signals are generated in a high frequency signal injection mode based on the position of each phase. For example, the MCU 125 may activate the SMU 145 to generate a sensor-less control waveform (e.g., a sinusoidal waveform, a trapezoidal waveform) to the driver unit 130. In some examples, the SMU 145 may generate the control waveform based on phase positions of the BLDC motor 115 in the high frequency signal injection mode.

After the motor control signals are generated, feedback signals are received from a low loss sensing circuit in step 420. For example, the MCU 125 may receive the feedback signals from the LLHFS 150. For example, the MCU 125 may receive the sense output S from the LLHFS 150 as described with reference to FIG. 2.

In step 425, a current flow at each phase of the motor is determined as a function of the feedback signals and the current flow of each phase. For example, the LLHFS 150 may include SENSEFET that generate the sense output S having a predetermined proportion of a drain current of a power transistor connected to a source terminal of the SENSEFET as described with reference to FIGS. 2-3. In some implementations, the current flow may be determined as a linear function of the sense output S of the LLHFS 150. In some implementations, the current flow may be determined as a nonlinear function (e.g., polynomial function, discrete function, logic function) of the sense output S of the LLHFS 150.

Next, in step 430, the position of each phase of the motor is updated based on the current flow. For example, the MCU 125 may determine the position s of each phase of the BLDC motor 115 based on the current flow at the drain terminals (U, V, W) of the power transistors Q1, Q3, and Q5. In step

435, a revolution speed of the motor is determined. For example, the MCU 125 may receive a revolution speed of the BLDC motor 115 from the LFSP 155. For example, the MCU 125 may determine the revolution speed based on signal received at the Hall/back-EMF module 325.

In a decision point 440, it is determined whether the revolution speed is larger than a threshold. For example, the threshold may be 500 rpm. For example, the threshold may be predetermined based on a motor speed that is controllable using a phase lock loop (PLL). For example, the motor may require additional control signals generated by a PI controller when the motor speed is below the threshold.

If the revolution speed is lower than the threshold, the step 415 is repeated. If the revolution speed is higher than the threshold, in step 445, the motor control signals are generated in a steady-state mode, and the method 400 ends. For example, the MCU 125 may generate the signal to the driver unit 130 in the steady-state mode.

Although various embodiments have been described with reference to the figures, other embodiments are possible. In some implementations, the power transistors and the sense transistors may include field-effect transistors (FET), for example, MOSFET. In some examples, the power transistors and the sense transistors may include bipolar junction transistors (BJT). For example, the sense transistor may be configured to generate a current proportional to a collector current of the BJT. In some examples, the power transistors and the sense transistors may include insulated gate bipolar transistors (IGBT).). For example, the sense transistor may be configured to generate a current proportional to a collector current of the IGBT.

Although an exemplary system has been described with reference to the figures, other implementations may be deployed in other industrial, scientific, medical, commercial, and/or residential applications.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Temporary auxiliary energy inputs may be received, for example, from chargeable or single use batteries, which may enable use in portable or remote applications. Some embodiments may operate with other DC voltage sources, such as a (nominal) batteries, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an illustrative aspect, a motor driver package may include a gate driver circuit may include N phases. For example, N may be an integer larger or equal to 1, and each i-th phase (1<=i<=N) of the N phases may include a corresponding power transistor (Pi) may include a gate terminal and a drain terminal. For example, Pi may be configured to generate a motor control signal at the drain terminal for the i-th phase.

For example, the motor driver package may include a logic control circuit coupled to the gate driver circuit. For example, the logic control circuit may include a microcontroller unit. For example, the logic control circuit may include a signal modulation engine. For example, the signal modulation engine may include a program of instructions. For example, the microcontroller unit may be configured to execute the signal modulation engine to generate N control waveforms, W1, W2, . . . , Wi, . . . . WN. For example, Wi corresponds to the i-th phase and may be received by the gate terminal of the Pi.

For example, the motor driver package may include a low loss high frequency sensing circuit coupled to the logic control circuit. For example, the low loss high frequency sensing circuit may include, for each of the Pi, a sense field-effect transistor (SENSEFET) Si. For example, the Si may include a source terminal connected to the drain terminal of Pi. For example, the Si may include a gate terminal coupled to the logic control circuit. For example, a signal received at the gate terminal may be synchronously related to the signal received at the gate terminal of Pi.

For example, in operation, the low loss high frequency sensing circuit may be configured to generate a sensing output may include a plurality of current sensing outputs, each corresponds to a current output of a sense terminal of the SENSEFET of each of the N phases. For example, the current output of the sense terminal of Si may be a positive fraction of a current input at the source terminal of Si.

For example, the logic control circuit may be configured to determine a phase information as a function of the sensing output in a high frequency signal injection mode. For example, the signal modulation engine may be configured to generate the N control waveforms as a function of the phase information. For example, the logic control circuit, the gate driver circuit, and the low loss high frequency sensing circuit may be integrated within a unified physical package.

For example, the N control waveforms may include a trapezoidal wave. For example, the signal modulation engine may include a space vector modulation engine. For example, the logic control circuit may include a feedback controller configured to generate an error signal. For example, in a steady-state mode, the signal modulation engine may be configured to generate the N control waveforms based on the error signal independent of the sensing output.

The motor driver package may include a velocity input connected to the logic control circuit. For example, the velocity input may be configured receive a speed signal representing a revolution speed of a motor connected to the motor driver package. For example, the logic control circuit may be configured to operate the high frequency signal injection mode based on revolution speed less than a predetermined threshold.

For example, the predetermined threshold may include 500 rpm. For example, the logic control circuit may be configured to transit from the high frequency signal injection mode to the steady-state mode when the revolution speed of the motor may be above the predetermined threshold.

For example, N>=3. For example, the sense output of the low loss high frequency sensing circuit may be temperature insensitive between −40° C. to 125° C.

In an illustrative aspect, a motor driver package may include a gate driver circuit. The gate driver circuit, for example, may include N phases. For example, N may be an integer larger or equal to 1, and each i-th phase (1<=i<=N) of the N phases may include a corresponding power transistor (Pi) may include a gate terminal and a drain terminal. For example, Pi may be configured to generate a motor control signal and a drain output current at the drain terminal based on a gate signal received at the gate terminal.

For example, the motor driver package may include a logic control circuit coupled to the gate terminal of each power transistor P1, P2, . . . , PN. For example, the logic control circuit may be configured to generate the gate signal for each power transistor Pi, 1<=i<=N. For example, the motor driver package may include a low loss high frequency sensing circuit coupled to the logic control circuit. For example, the low loss high frequency sensing circuit may be configured to generate a sensing output may include a plurality of current sensing outputs, (O1, O2, . . . . Oi, . . . . ON) each corresponds to one of the N phases.

For example, Oi may be a positive fraction of the drain output current of Pi. For example, in a high frequency signal injection mode, the logic control circuit may be configured to generate the gate signal of each of the N phases as a function of the sensing output.

For example, the motor driver package may include the logic control circuit, the gate driver circuit, and the low loss high frequency sensing circuit may be integrated within a unified physical package.

For example, the low loss high frequency sensing circuit may include, for each of the N phases, a sense field-effect transistor (SENSEFET). For example, the SENSEFET may include a sense source terminal connected to a drain terminal of the corresponding power transistor. For example, the SENSEFET may include a sense gate terminal coupled to the logic control circuit. For example, a signal received at the sense gate terminal may be synchronously related to the gate signal received at the gate terminal of the corresponding power transistor. For example, the SENSEFET may include a sense terminal configured to generate a corresponding one of the plurality of current sensing outputs.

For example, the logic control circuit may include a microcontroller unit and a signal modulation engine may include a program of instructions. For example, the microcontroller unit may be configured to execute the signal modulation engine to generate the gate signal based on the sensing input. For example, the gate signal may include a control waveform.

For example, the control waveform may include a trapezoidal wave. For example, the signal modulation engine a space vector pulse width modulation engine. For example, the logic control circuit may include a feedback controller configured to generate an error signal wherein, in a steady-state mode, the SVPWM engine generates the control waveform based on the error signal independent of the sensing output.

The motor driver package may include a velocity input connected to the logic control circuit. For example, the velocity input may be configured receive a speed signal representing a revolution speed of a motor connected to the motor driver package. For example, the logic control circuit may be configured to operate in the high frequency signal injection mode based on revolution speed less than a predetermined threshold.

For example, the predetermined threshold may include 500 rpm. For example, the logic control circuit may be configured to transit from the high frequency signal injection mode to the steady-state mode when the revolution speed of the motor may be above the predetermined threshold. For example, N>=3. For example, the sense output of the low loss high frequency sensing circuit may be temperature insensitive between −40° C. to 125° C.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A motor driver package comprising:

a gate driver circuit comprising N phases, wherein N is an integer larger or equal to 1, and each i-th phase (1<=i<=N) of the N phases comprises a corresponding power transistor (Pi) comprising a gate terminal and a drain terminal, wherein Pi is configured to generate a motor control signal at the drain terminal for the i-th phase;

a logic control circuit coupled to the gate driver circuit, comprises:

a microcontroller unit comprising; a processor, a memory module comprising a program of instructions, and a signal modulation engine wherein the microcontroller unit is configured to execute the signal modulation engine to generate N control waveforms, W1, W2, . . . , Wi, . . . WN, wherein Wi corresponds to the i-th phase and is received by the gate terminal of the Pi; and, a low loss high frequency sensing circuit coupled to the logic control circuit, wherein the low loss high frequency sensing circuit comprises, for each of the Pi, a sense field-effect transistor (SENSEFET) Si, wherein the Si comprises:

a source terminal connected to the drain terminal of Pi;

a gate terminal coupled to the logic control circuit, wherein a signal received at the gate terminal is synchronously related to the signal received at the gate terminal of Pi; and, in operation, the low loss high frequency sensing circuit is configured to generate a sensing output comprising a plurality of current sensing outputs, each corresponds to a current output of a sense terminal of the SENSEFET of each of the N phases, wherein the current output of the sense terminal of Si is a positive fraction of a current input at the source terminal of Si, wherein:

the logic control circuit is configured to determine a phase information as a function of the sensing output in a high frequency signal injection mode;

the signal modulation engine is configured to generate the N control waveforms as a function of the phase information; and, the logic control circuit, the gate driver circuit, and the low loss high frequency sensing circuit are integrated within a unified physical package.

2. The motor driver package of claim 1, wherein the N control waveforms comprise a trapezoidal wave.

3. The motor driver package of claim 1, wherein the signal modulation engine comprises a space vector modulation engine.

4. The motor driver package of claim 1, wherein the logic control circuit further comprises a feedback controller configured to generate an error signal wherein, in a steady-state mode, the signal modulation engine is configured to generate the N control waveforms based on the error signal independent of the sensing output.

5. The motor driver package of claim 4, further comprises a velocity input connected to the logic control circuit, wherein the velocity input is configured to receive a speed signal representing a revolution speed of a motor connected to the motor driver package, wherein the logic control circuit is configured to operate the high frequency signal injection mode based on revolution speed less than a predetermined threshold.

6. The motor driver package of claim 5, wherein the predetermined threshold comprises 500 rpm.

7. The motor driver package of claim 5, wherein the logic control circuit is configured to transit from the high frequency signal injection mode to the steady-state mode when the revolution speed of the motor is above the predetermined threshold.

8. The motor driver package of claim 1, wherein N>=3.

9. The motor driver package of claim 1, wherein the sense output of the low loss high frequency sensing circuit is temperature insensitive between −40° C. to 125° C.

10. A motor driver package comprising:

a gate driver circuit comprising N phases, wherein N is an integer larger or equal to 1, and each i-th phase (1<=i<=N) of the N phases comprises a corresponding power transistor (Pi) comprising a gate terminal and a drain terminal, wherein Pi is configured to generate a motor control signal and a drain output current at the drain terminal based on a gate signal received at the gate terminal;

a logic control circuit coupled to the gate terminal of each power transistor P1, P2, . . . , PN, wherein the logic control circuit is configured to generate the gate signal for each power transistor Pi, 1<=i<=N; and, a low loss high frequency sensing circuit coupled to the logic control circuit, wherein the low loss high frequency sensing circuit is configured to generate a sensing output comprising a plurality of current sensing outputs, (O1, O2, . . . Oi, . . . ON) each corresponds to one of the N phases, wherein:

Oi is a positive fraction of the drain output current of Pi;

in a high frequency signal injection mode, the logic control circuit is configured to generate the gate signal of each of the N phases as a function of the sensing output; and, the logic control circuit, the gate driver circuit, and the low loss high frequency sensing circuit are integrated within a unified physical package.

11. The motor driver package of claim 10, wherein the low loss high frequency sensing circuit comprises, for each of the N phases, a sense field-effect transistor (SENSEFET), wherein the SENSEFET comprises:

a sense source terminal connected to a drain terminal of the corresponding power transistor;

a sense gate terminal coupled to the logic control circuit, wherein a signal received at the sense gate terminal is synchronously related to the gate signal received at the gate terminal of the corresponding power transistor; and, a sense terminal configured to generate a corresponding one of the plurality of current sensing outputs.

12. The motor driver package of claim 10, wherein the logic control circuit comprises a microcontroller unit comprising a processor, a memory module comprising a program of instructions, and a signal modulation engine, wherein the microcontroller unit is configured to execute the signal modulation engine to generate the gate signal based on the sensing input, wherein the gate signal comprises a control waveform.

13. The motor driver package of claim 12, wherein the control waveform comprises a trapezoidal wave.

14. The motor driver package of claim 12, wherein the signal modulation engine comprises a space vector pulse width modulation engine.

15. The motor driver package of claim 12, wherein the logic control circuit further comprises a feedback controller configured to generate an error signal wherein, in a steady-state mode, the SVPWM engine generates the control waveform based on the error signal independent of the sensing output.

16. The motor driver package of claim 15, further comprises a velocity input connected to the logic control circuit, wherein the velocity input is configured to receive a speed signal representing a revolution speed of a motor connected to the motor driver package, wherein the logic control circuit is configured to operate in the high frequency signal injection mode based on revolution speed less than a predetermined threshold.

17. The motor driver package of claim 16, wherein the predetermined threshold comprises 500 rpm.

18. The motor driver package of claim 16, wherein the logic control circuit is configured to transit from the high frequency signal injection mode to the steady-state mode when the revolution speed of the motor is above the predetermined threshold.

19. The motor driver package of claim 10, wherein N>=3.

20. The motor driver package of claim 10, wherein the sense output of the low loss high frequency sensing circuit is temperature insensitive between −40° C. to 125° C.

* * * * *